United States Patent [19]
White

[11] Patent Number: 5,924,095
[45] Date of Patent: Jul. 13, 1999

[54] PROCESSING DISTRIBUTED TRANSACTIONS IN HETEROGENEOUS COMPUTING ENVIRONMENTS USING TWO-PHASE COMMIT

[75] Inventor: Mark S. White, San Mateo, Calif.

[73] Assignee: Oracle Corporation, Redwood Shores, Calif.

[21] Appl. No.: 08/796,169

[22] Filed: Feb. 5, 1997

[51] Int. Cl.[6] ........................................ G06F 17/30
[52] U.S. Cl. .......................... 707/10; 707/201; 707/202
[58] Field of Search ................................. 707/200, 201, 707/10, 202; 395/200.6

[56] References Cited

U.S. PATENT DOCUMENTS

| | | | |
|---|---|---|---|
| 5,329,626 | 7/1994 | Klein et al. | 395/200.78 |
| 5,428,771 | 6/1995 | Daniels et al. | 395/671 |
| 5,465,328 | 11/1995 | Dievendorff et al. | 395/182.13 |
| 5,561,797 | 10/1996 | Gilles et al. | 707/8 |
| 5,586,312 | 12/1996 | Johnson et al. | 707/10 |
| 5,680,610 | 10/1997 | Smith et al. | 707/10 |
| 5,706,429 | 1/1998 | Lai et al. | 395/200.6 |

*Primary Examiner*—Wayne Amsbury
*Assistant Examiner*—Cheryl Lewis
*Attorney, Agent, or Firm*—McDermott, Will & Emery

[57] ABSTRACT

A gateway provides for the processing of transactions in a heterogeneous database environment using LU6.2 two-phase commit involving a database, supporting a first communication protocol, and an LU6.2 transaction manager associated with a database supporting a second communication protocol. The gateway includes a first protocol manager for providing communication between the gateway and the database according to the first communication protocol. The gateway also includes an LU6.2 protocol manager for providing LU6.2 communication between the gateway and the LU6.2 two-phase commit transaction manager.

17 Claims, 8 Drawing Sheets

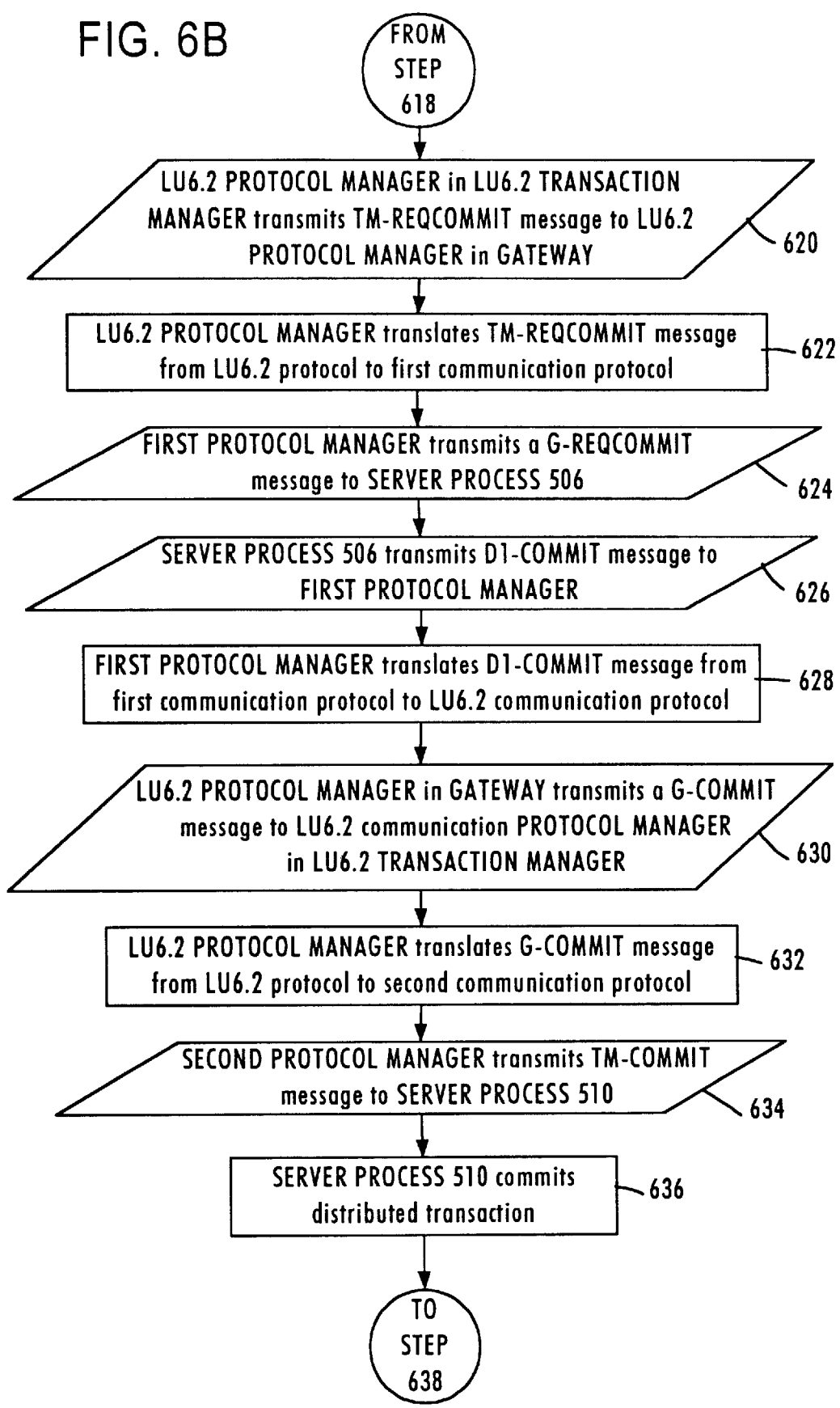

PROCESSING DISTRIBUTED TRANSACTIONS IN HETEROGENEOUS COMPUTING ENVIRONMENTS USING TWO-PHASE COMMIT

FIELD OF THE INVENTION

The present invention relates to distributed computing environments, and more specifically, to a method and apparatus for processing distributed transactions in heterogeneous computing environments using two-phase commit.

BACKGROUND OF THE INVENTION

One of the long standing challenges in distributed computing has been to maintain data consistency across all of the nodes in a network. Perhaps nowhere is data consistency more important than in distributed database systems, where a distributed transaction may specify updates to related data residing on different database systems. To maintain data consistency the distributed transaction must be either committed or, in the event of an error, "rolled back". When a transaction is committed, all of the changes to data specified by the transaction are made permanent. On the other hand, when a transaction is rolled back, all of the changes to data specified by the transaction already made when the error occurred are retracted or undone, as if the changes to the data were never made.

One approach for maintaining data consistency for distributed transactions involves processing data on one database system at a time. All changes specified by the transaction to data residing in a particular database system are applied and confirmed before changes specified by the transaction are applied within another database system. Although this approach ensures data consistency across the distributed database system, database changes specified by the transaction are made serially, requiring more time to complete the transaction.

Consider the simple distributed database system 100 depicted in FIG. 1 which includes a database systems 102, 104 and 106. Database system 102 includes a server process 108 and a database 110. Database system 104 also includes a server process 112 and a database 114. Finally, database system 106 includes a server process 116 and a database 118.

Suppose a mail order transaction, which requires updates to product inventory data contained in database 110 and credit information contained in database 114, is being processed by server process 108 according to a conventional non-two-phase commit approach. The mail order transaction may be initiated by a database application, for example, that is in communication with database system 102.

In order to process the mail order transaction, server process 108 must first determine from database 110 whether the desired product is available in inventory and from server process 112 associated with database 114 whether sufficient credit is available to pay for the desired product. Having determined that the product and credit availability requirements are met, server process 108 processes the transaction (order) by updating database 110, to reduce the available inventory, and then causing server process 112 to update database 114 to reduce the amount of available credit.

An error preventing the update of either the product inventory on database 110 or the credit information on database 114 would leave the distributed database system 100 in an inconsistent state. For example, if an error prevented an update to the product inventory contained in database 110, a subsequent transaction for an order of the same product may erroneously determine that the previously ordered product is still available, even though it has been removed from inventory.

Another approach for ensuring data consistency during distributed transactions involves processing distributed transactions using a two-phase commit mechanism. Two-phase commit requires that the transaction first be prepared and then committed. During the preparation phase, the changes specified by the transaction are made at each of the participating database systems. If all of the changes are made without error at each of the participating database systems, then the changes are committed (made permanent). On the other hand, if any errors occur during the prepare phase, indicating that at least one of the participating database systems could not make the changes specified by the transaction, then all of the changes at each of the participating database systems are retracted, restoring each participating database system to its state prior to the changes. Unlike the prior serial approach, this approach ensures data consistency while providing simultaneous processing of the changes.

Assume that database systems 102, 104 are homogeneous and support compatible communication protocols and the processing of transactions by two-phase commit. Processing the same mail order transaction using two-phase commit maintains data consistency while providing simultaneous processing of the changes on database 110 and database 114. Processing begins when server process 108 initiates the prepare phase by commanding server process 112 to reduce the amount of available credit by updating database 114. Server process 108 concurrently reduces the available inventory by updating database 110. At this point in the processing of the transaction, although the changes to available credit and available inventory may have actually been applied to database 110 and database 114 respectively, neither of the changes to database 110 nor database 114 have been made permanent. Once both server process 108 and server process 112 have made their respective changes as specified by the transaction without error, the prepare phase is complete.

Upon being informed that the transaction is successfully prepared in database system 104, server process 108 then initiates the commit phase by commanding server process 112 to make the reduction in available inventory in database 114 permanent, while server process 108 makes the reduction in available credit in database 110 permanent. Once the changes have been made permanent in databases 110, 114, the commit phase and processing of the transaction is complete. However, if any errors occur during the prepare phase, that is while server process 108 is updating the available inventory in database 110 or while server process 112 is updating the available credit on database 114, then the updates to both databases 110, 114 are rolled back. This approach ensures that all of the changes specified by the transaction will either be completed successfully and made permanent to databases 110, 114 or, in the event of an error, rolled back.

As illustrated by the preceding example, the two-phase commit mechanism provides the full utilization of the power and flexibility offered by a distributed database system while maintaining data consistency. However, the two-phase commit mechanism can only be implemented for distributed transactions involving homogeneous database systems 102, 104 which support the same two-phase commit communication protocols. For distributed transactions involving heterogeneous database systems, which do not support a common communication protocol, the transactions must be processed serially which requires more time to complete the transactions. For example, as illustrated in FIG. 1, database system 102 and database system 106 do not support a common communication protocol. Therefore, distributed transactions that involve changes to be made in databases 110, 118 cannot be implemented with two-phase commit and must be processed serially.

In view of the inefficiencies associated with processing distributed database transactions serially, a method and apparatus providing for the processing of distributed transactions in heterogeneous computing environments using two-phase commit is highly desirable.

SUMMARY OF THE INVENTION

A method and apparatus are provided for processing distributed transactions in a heterogeneous computing environment using two-phase commit.

According to one aspect of the present invention, a method is provided for processing a distributed transaction using two-phase commit where the distributed transaction specifies a first set of operations to be performed by a first process supporting a first communication protocol, and a second set of operations to be performed by a second process supporting a second communication protocol and having a transaction manager communicatively coupled thereto. First, a prepare message conforming to the first communication protocol is received from the first process. Then, a prepare message conforming to a third communication protocol is transmitted to the transaction manager causing the second process to perform the second set of operations without making the results of performing the second set of operations permanent. A confirm prepare message conforming to the third communication protocol is then received from the transaction manager indicating that the second set of operations has been performed by the second process. Then, a confirm prepare message conforming to the first communication protocol is transmitted to the first process. A commit message conforming to the first communication protocol is then received from the first process. Finally, a commit message conforming to the third communication protocol is transmitted to the transaction manager communicatively coupled to the second process causing the second process to make the results of performing the second set of operations permanent.

According to another aspect of the present invention, a method facilitates the processing of a distributed transaction using two-phase commit where the distributed transaction specifies a first set of operations to be performed by a first database system supporting a first communication protocol, and a second set of operations to be performed by a second database system supporting a second communication protocol and having an LU6.2 transaction manager communicatively coupled thereto. First, in response to receiving prepare and commit messages from the first database system conforming to the first communication protocol the prepare and commit messages are translated to conform to LU6.2 communication protocol. Then, the translated prepare and commit messages are transmitted to the LU6.2 transaction manager communicatively coupled to the second database system, causing the second database system to perform the second set of operations without making the results permanent. The translated commit messages cause the second database system to make the results of performing the second set of operations permanent. Next, in response to receiving confirm prepare and confirm commit messages conforming to LU6.2 communication protocol from the LU6.2 transaction manager communicatively coupled to the second database system, the confirm prepare and confirm commit messages are translated to conform to the first communication protocol and then transmitted to the first database system.

According to another aspect of the present invention, a system is provided for processing a distributed transaction using two-phase commit where the distributed transaction specifies a first set of operations to be performed by a first process and a set of second operations to be performed by two or more second processes. The first process supports a first communication protocol, while each of the second processes supports a second communication protocol and has an LU6.2 transaction manager communicatively coupled thereto. The system includes one or more nodes and a gateway executing on the one or more nodes. The gateway is configured to first receive prepare and commit messages conforming to the first communication protocol from the first process and transmit prepare and commit messages conforming to LU6.2 communication protocol to each of the LU6.2 transaction managers. The gateway is also configured to receive confirm prepare and confirm commit messages conforming to LU6.2 communication protocol from each of the LU6.2 transaction managers, and if a confirm prepare message has been received from each of the LU6.2 transaction managers, transmit a confirm prepare message conforming to the first communication protocol to the first process. If any of the second processes cannot perform its respective second operation specified by the distributed transaction, the gateway is configured to transmit a roll back message conforming to the LU6.2 communication protocol to each of the LU6.2 transaction managers causing each of the second processes to undo its respective second operations specified by the distributed transaction. On the other hand, if a confirm commit message has been received from each of the LU6.2 transaction managers, then a confirm commit message conforming to the first communication protocol is transmitted to the first process.

According to another aspect of the present invention, a gateway is provided for the processing of a distributed transaction using two-phase commit where the distributed transaction specifies a set of first operations to be performed by a first process, and a set of second operations to be performed by one or more second processes. The first process supports a first communication protocol while each of the second processes supports a second communication protocol and has an LU6.2 transaction manager communicatively coupled thereto. The gateway includes a first protocol manager and an LU6.2 protocol manager. The first protocol manager is configured to receive prepare and commit messages conforming to the first communication protocol from the first process, and transmit prepare and commit messages conforming to LU6.2 communication protocol to each of the LU6.2 transaction managers. The LU6.2 protocol manager is configured to receive confirm prepare and confirm commit messages conforming to LU6.2 communication protocol from each of the LU6.2 transaction managers, and if a confirm prepare message has been received from each of the LU6.2 transaction managers, transmit a prepare message conforming to the first communication protocol to the first process. If any of the second processes cannot perform its respective second operation specified by the distributed transaction, the LU6.2 protocol manager transmits a roll back message conforming to LU6.2 communication protocol to each of the LU6.2 transaction managers causing each of the second processes to undo its respective second operation specified by the distributed transaction. If a confirm commit message has been received from each of the LU6.2 transaction managers, the LU6.2 protocol manager transmits a confirm commit message conforming to the first communication protocol to the first process.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A, 6B and 6C comprise a flow chart illustrating a method for processing distributed transactions in a heterogeneous database system using two-phase commit.

DETAILED DESCRIPTION OF THE PREFERRED EMBODIMENT

A method and apparatus for processing distributed transactions in a heterogeneous computing environment using two-phase commit is described. In the following description, for the purposes of explanation, numerous specific details are set forth in order to provide a thorough understanding of the present invention. However, the present invention may be practiced without these specific details. In other instances, well-known structures and devices are shown in block diagram form in order to avoid unnecessarily obscuring the present invention.

HARDWARE OVERVIEW

Figure 1:
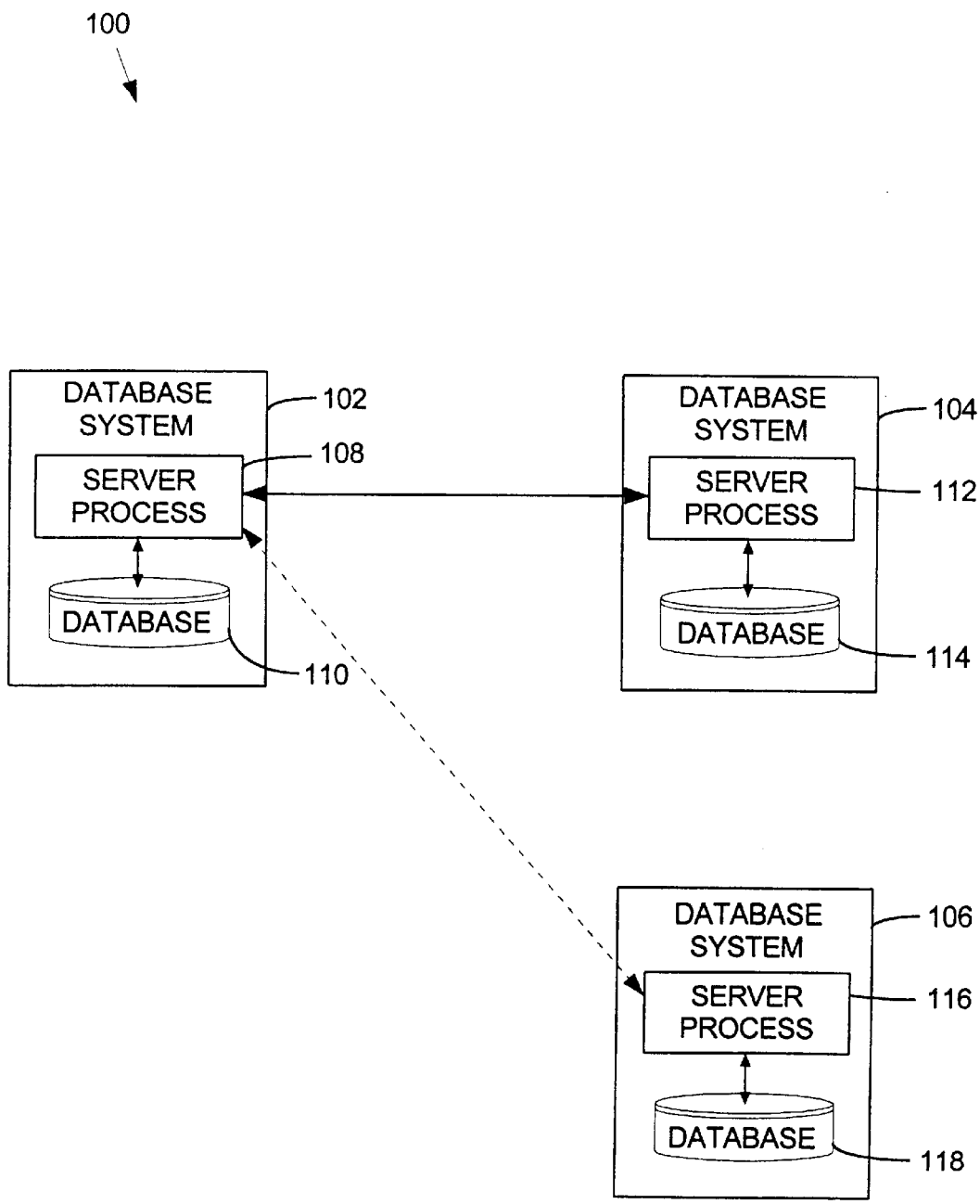
FIG. 1 is a block diagram of a conventional distributed database system.
Figure 2:
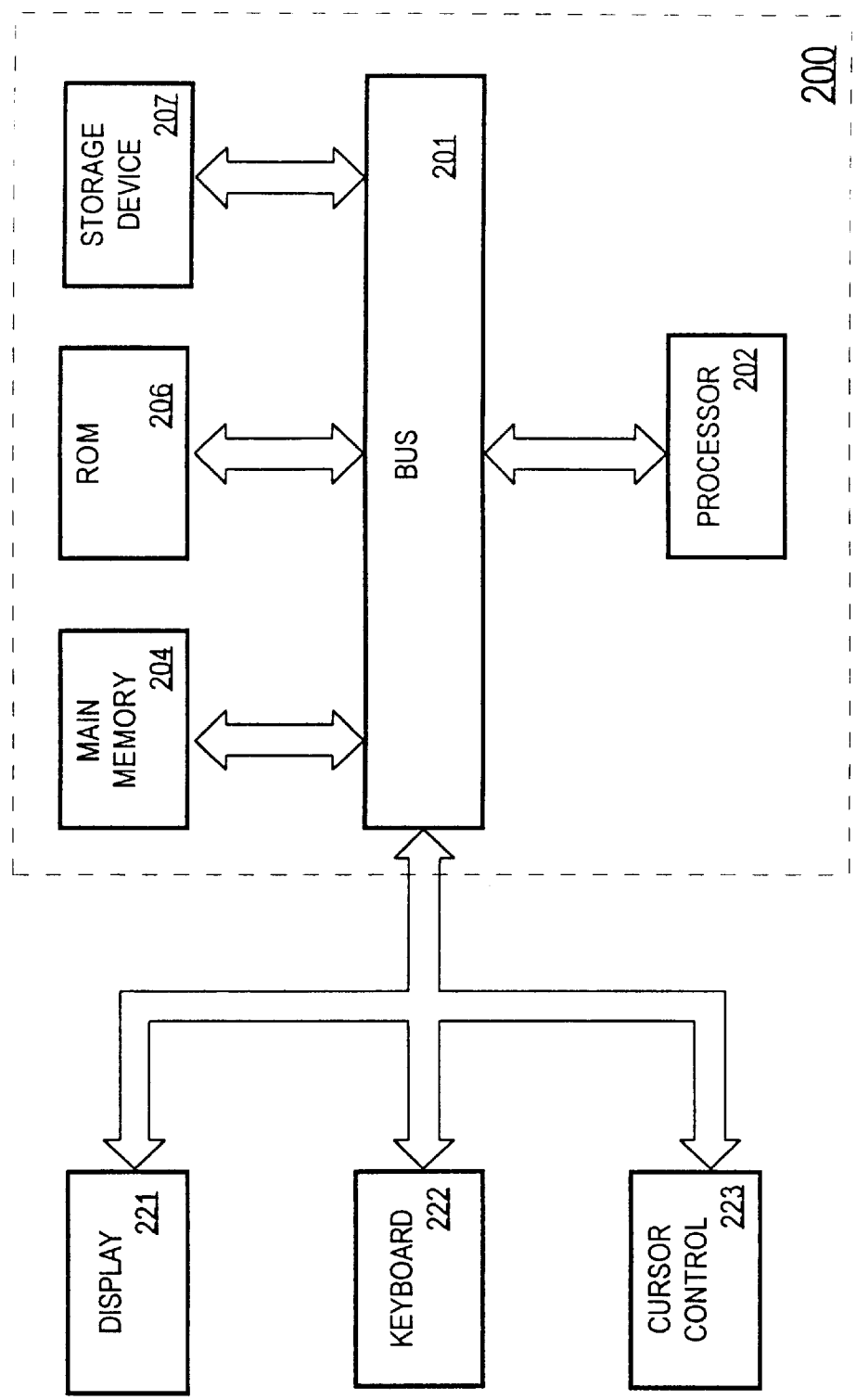
FIG. 2 is a block diagram of a computer system on which the present invention may be implemented.

FIG. 2 illustrates a block diagram of a computer system 200 upon which an embodiment of the present invention may be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also includes a read only memory (ROM) and/or other static storage device 206 coupled to bus 201 for storing static information and instructions for processor 202. A data storage device 207, such as a magnetic disk or optical disk, is coupled to bus 201 for storing information and instructions.

Computer system 200 may also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to process distributed transactions in a heterogeneous computing environment using two-phase commit. According to one embodiment, distributed transactions are processed using two-phase commit by computer system 200 in response to processor 202 executing sequences of instructions contained in memory 204. Such instructions may be read into memory 204 from another computer-readable medium, such as data storage device 207. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

Figure 3:
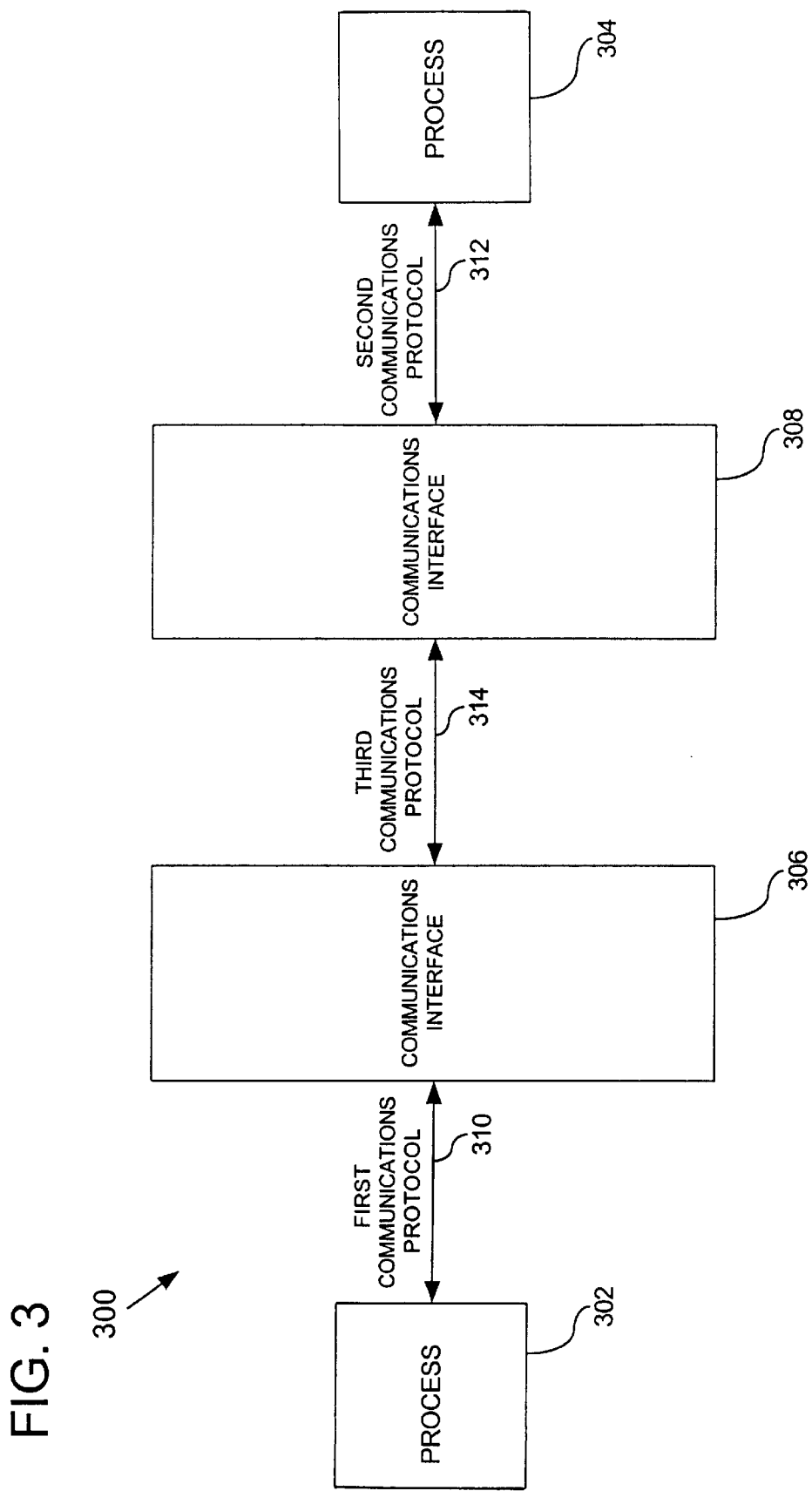
FIG. 3 is a block diagram of an apparatus for processing distributed transactions in a heterogeneous computing environment using two-phase commit according to an embodiment of the present invention.

FIG. 3 illustrates an arrangement 300 for processing distributed transactions in a heterogeneous computing environment using two-phase commit according to an embodiment of the present invention. The block diagram of FIG. 3 provides a general introduction of the use of the two-phase commit mechanism to process distributed transactions according to an embodiment of the present invention. A more detailed explanation is provided below in conjunction with FIGS. 4 and 5.

Arrangement 300 includes a process 302 and a process 304 for carrying out at least some of the operations required to process a distributed transaction. Arrangement 300 also includes a communications interface 306 and a communications interface 308.

Arrangement 300 is heterogeneous in that processes 302, 304 do not support the same communication protocol. Specifically, process 302 communicates with other processes, including communications interface 306, according to a first communication protocol 310. On the other hand, process 304 communicates with other processes, including communications interface 308, according to a second communication protocol 312. Communications interface 306 is communicatively coupled with communications interface 308 and communicates with communications interface 308 according to a third communication protocol 314.

Assume that a distributed transaction specifies that some operations be performed by process 302 and other operations be performed by process 304. The processing of the distributed transaction by both process 302 and process 304 using two-phase commit requires that both process 302 and process 304 prepare the transaction and then commit the transaction. As previously discussed, preparing a transaction means performing all of the operations (changes to data) specified by the transaction. Committing the transaction means making all of the changes made during the prepare phase permanent.

For the situation where process 302 coordinates the processing of the distributed transaction, process 302 transmits one or more messages to process 304 instructing process 304 to prepare the transaction by performing the operations specified by the transaction that must be performed by process 304. At the same time, process 302 also prepares the transaction by performing its own operations as specified by the transaction.

Once process 304 has completed the operations specified by the transaction, process 304 transmits a message to process 302 indicating that it has prepared the transaction. Once process 302 has prepared the transaction by completing its own operations specified by the transaction, and is informed that process 304 has also prepared the transaction, process 302 transmits another message to process 304 commanding process 304 to commit the transaction by making the changes previously made by process 304 permanent. At the same time, process 302 also makes the changes previously made by process 302 permanent. Once process 304 has committed the transaction, process 304 transmits a message to process 302 confirming that the transaction has been committed. Once process 302 has also committed the transaction by making the changes specified by the transaction permanent, the distributed transaction is completed and data consistency is assured.

However, if during the prepare phase, either process 302 or process 304 cannot prepare because of a failure, the transaction is rolled back, resulting in all changes made by process 302 and process 304 being retracted, again ensuring data consistency.

All messages transmitted by process 302 to process 304 are transmitted to the communications interface 306 and conform to the first communication protocol 310. The messages are received and translated by communications interface 306 to conform to the third communication protocol 314 and then transmitted by communications interface 306 to communications interface 308. Upon receiving messages from communications interface 306, communications interface 308 translates the messages to conform to the second communication protocol 312 and then transmits the messages to process 304. The reverse process occurs when messages are transmitted from process 304 to process 302.

Arrangement 300 facilitates the processing of distributed transactions by processes 302, 304 using two-phase commit even when process 302 and process 304 do not support compatible communication protocols.

Figure 4:
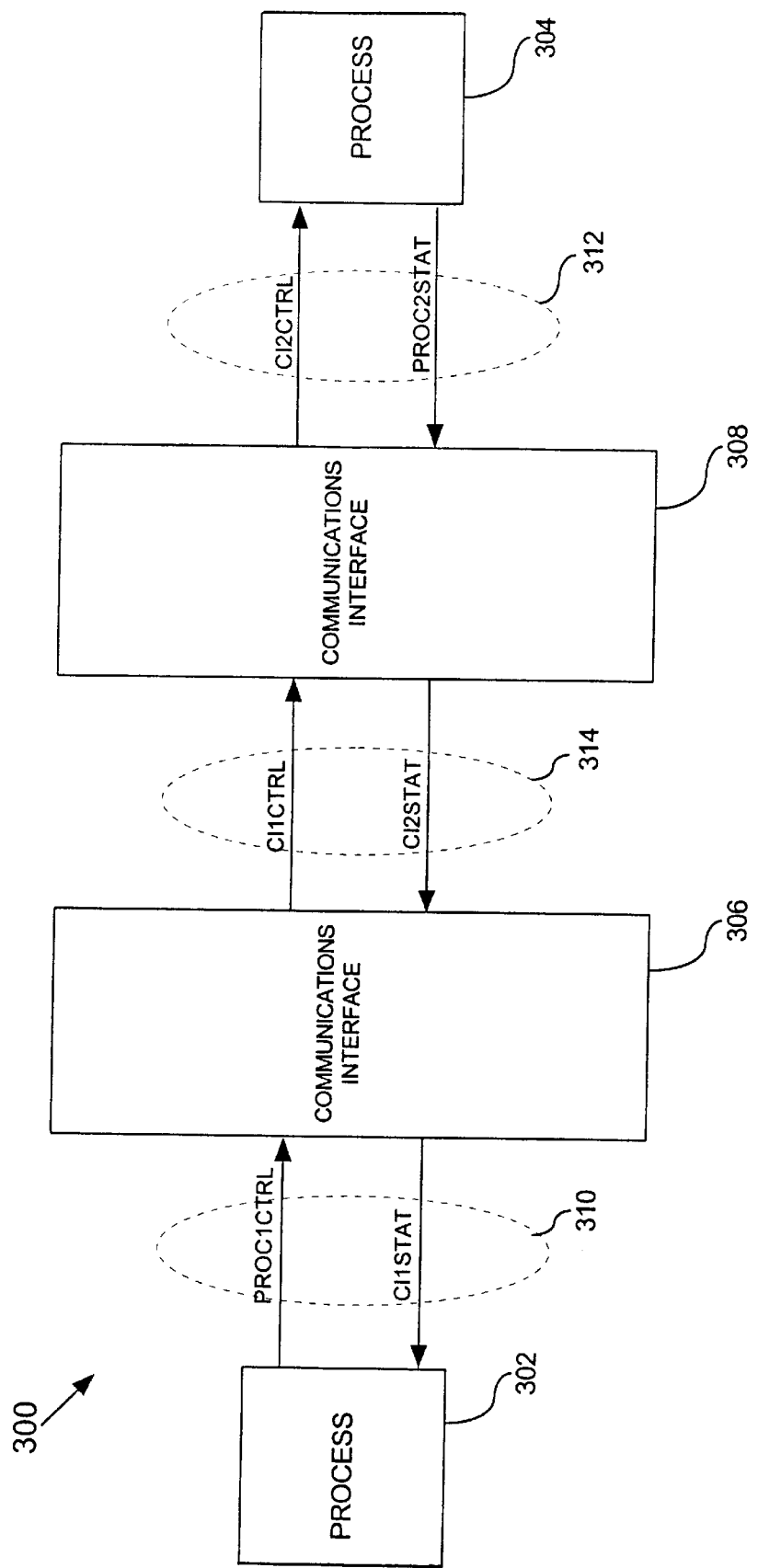
FIG. 4 is a detailed block diagram of the apparatus of FIG. 3.

FIG. 4 illustrates arrangement 300 of FIG. 3 in more detail. The processing of a distributed transaction on arrangement 300 using two-phase commit involves the concurrent application of changes to disparate but related sets of data by process 302 and process 304 as specified by the distributed transaction. To maintain data consistency across the distributed arrangement 300, the changes made by both process 302 and process 304 are either committed (made permanent), or rolled back (undone).

For example, a financial transaction requires updates to data by both process 302 and process 304. It is imperative that all updates be either made or undone to ensure the integrity of subsequent transactions. If process 302 completes its operation and updates its data and process 304 cannot because of a failure, subsequent transactions, operating under the assumption that all of the data was updated, will produce erroneous results.

According to a two-phase commit implementation, process 302 and process 304 first prepare the transaction by making their respective changes and reporting whether any errors occurred. Once process 302 and process 304 have each prepared the transaction with no errors, then the transaction is committed, resulting in all of the changes to data made by process 302 and process 304 being made permanent. However, if an error prevents either process 302 or process 304 from preparing, then both process 302 and process 304 roll back the transaction by retracting their respective changes to data.

The processing of a distributed transaction by both process 302 and process 304 using two-phase commit is now described with respect to FIG. 4. The process 302, process 304, communications interface 306 and communications interface 308 are communicatively coupled so as to provide for the transmission of messages as depicted in FIG. 4. First process 302 initiates the processing of the distributed transaction by issuing process control (PROC1CTRL) messages to communications interface 306. The PROC1CTRL messages conform to the first communication protocol 310. First communications interface 306 translates the PROC1CTRL messages to communications interface control (CI1CTRL) messages which are then transmitted to communications interface 308 according to the third communication protocol 314. Upon receipt of the CI1CTRL messages, communications interface 408 translates the CI1CTRL messages to communications interface control (CI2CTRL) messages which are transmitted to process 304 according to the second communication protocol 312. After receiving the CI2CTRL messages, process 304 prepares the transaction by making changes to data as specified by the transaction.

After applying its changes, process 304 transmits either a prepare or error message as part of the process status (PROC2STAT) messages to communications interface 308 according to the second communication protocol 312 to inform process 302 as to whether the prepare by process 304 was successful. Second communications interface 308 translates the PROC2STAT messages to CI2STAT messages which are transmitted to communications interface 306 according to the third communication protocol 314. First communications interface 306 translates the CI2STAT messages to CI1STAT messages which are transmitted to process 302 according to the first communication protocol 310.

Upon receipt of the CI1STAT messages, process 302 knows whether process 304 has either prepared successfully or experienced an error during the prepare phase. If processes 302, 304 both prepared successfully, process 302 commands process 304 to commit the transaction by transmitting a commit message as part of the PROC1CTRL messages. Second process 304 commits the transaction by making all of the changes previously made to data as specified by the transaction permanent. After committing the changed data specified by the transaction, process 304 issues a completion status as part of the PROC2STAT messages which are subsequently translated by communications interface 308 and communications interface 306 into CI1STAT messages to process 302 to inform process 302 that the transaction is complete. If however, either process 302 or process 304 could not prepare the transaction, then process 302 transmits a roll back message as part of the PROC1CTRL messages.

This approach ensures that the processing of distributed transactions involving both process 302 and process 304 may be processed while maintaining data consistency across the arrangement 300, even though the first and second communication protocols 310, 312 supported by process 302 and process 304, respectively, are incompatible.

Figure 5:
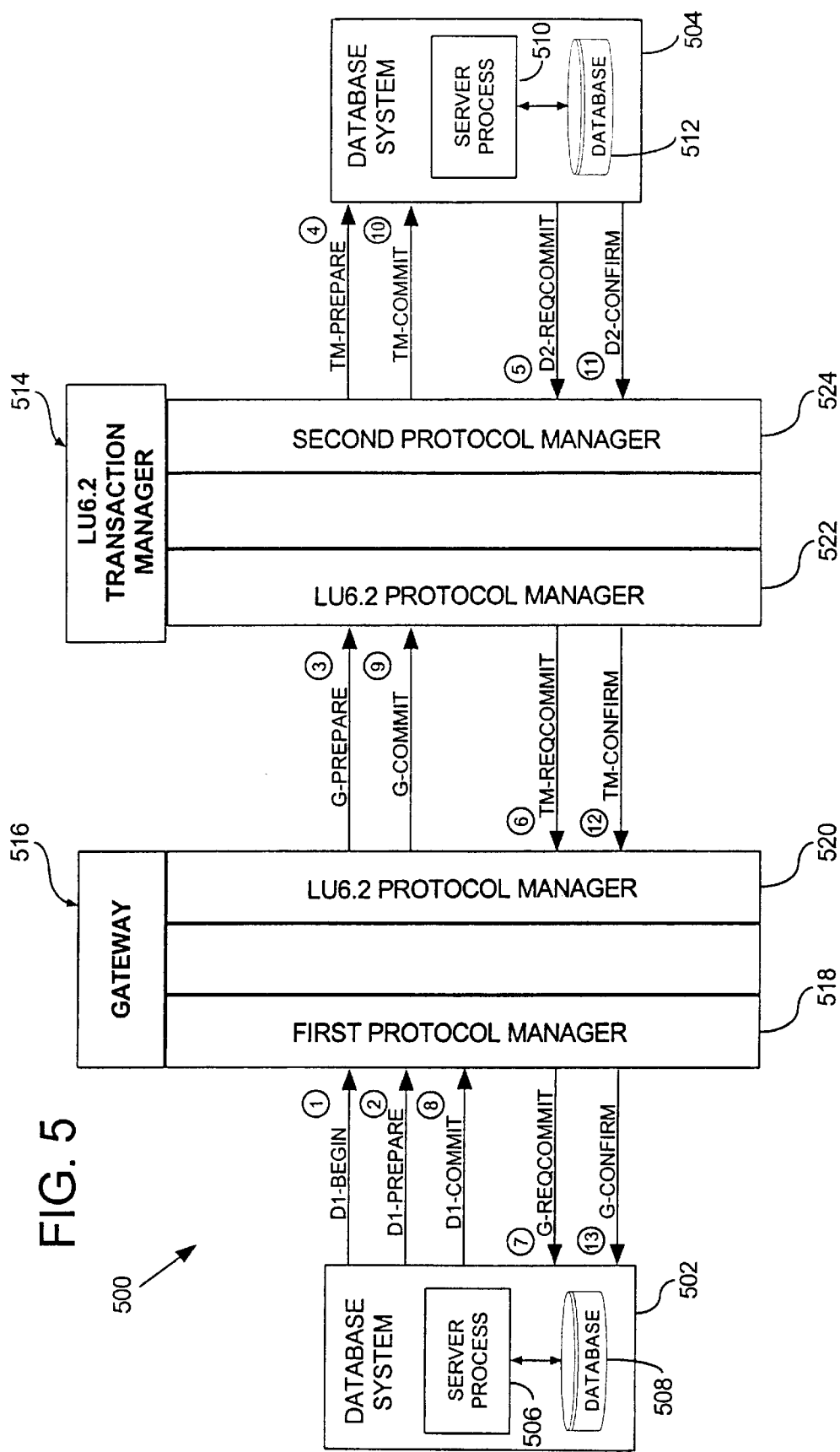
FIG. 5 is a block diagram of an apparatus for processing distributed transactions in a heterogeneous computing environment using two-phase commit according to a second embodiment of the present invention.

According to another embodiment of the present invention, an arrangement provides for the processing of distributed transactions using two-phase commit where the transaction specifies that changes be made on two separate database systems which do not support a common communication protocol. As illustrated in FIG. 5, a distributed database 500 includes a database system 502, supporting a first communication protocol, and a database system 504, supporting a second communication protocol. The database system 502 includes a server process 506 and a database 508. Server process 506 performs operations specified by transactions and makes updates to database 508. The database system 504 also includes a server process 510 and a database 512. Server process 510 performs operations specified by transactions and makes updates to database 512.

An LU6.2 transaction manager 514 is communicatively coupled to the database system 504. All communications between database system 504 and other resources are translated from database system protocol to LU6.2 protocol by LU6.2 transaction manager 514. Similarly, all communications between other resources and database system 504 are translated by the LU6.2 transaction manager 514 from LU6.2 protocol to database system protocol. The LU6.2 communication protocol is a widely accepted communication protocol originally developed by International Business Machines Corporation. For more information on the LU6.2 protocol please refer to "SNA Format and Protocol Reference Manual: Architecture Logic for LU Type 6.2".

Since database system 502 uses a two-phase commit protocol which is inconsistent with the LU6.2 protocol standard, database system 502 cannot directly initiate two-phase commit transactions with database system 504 or the LU6.2 transaction manager 514. To solve this problem, a gateway 516 is provided which facilitates the processing of distributed transactions involving both database system 502 and database system 504 using two-phase commit.

Figure 6A:
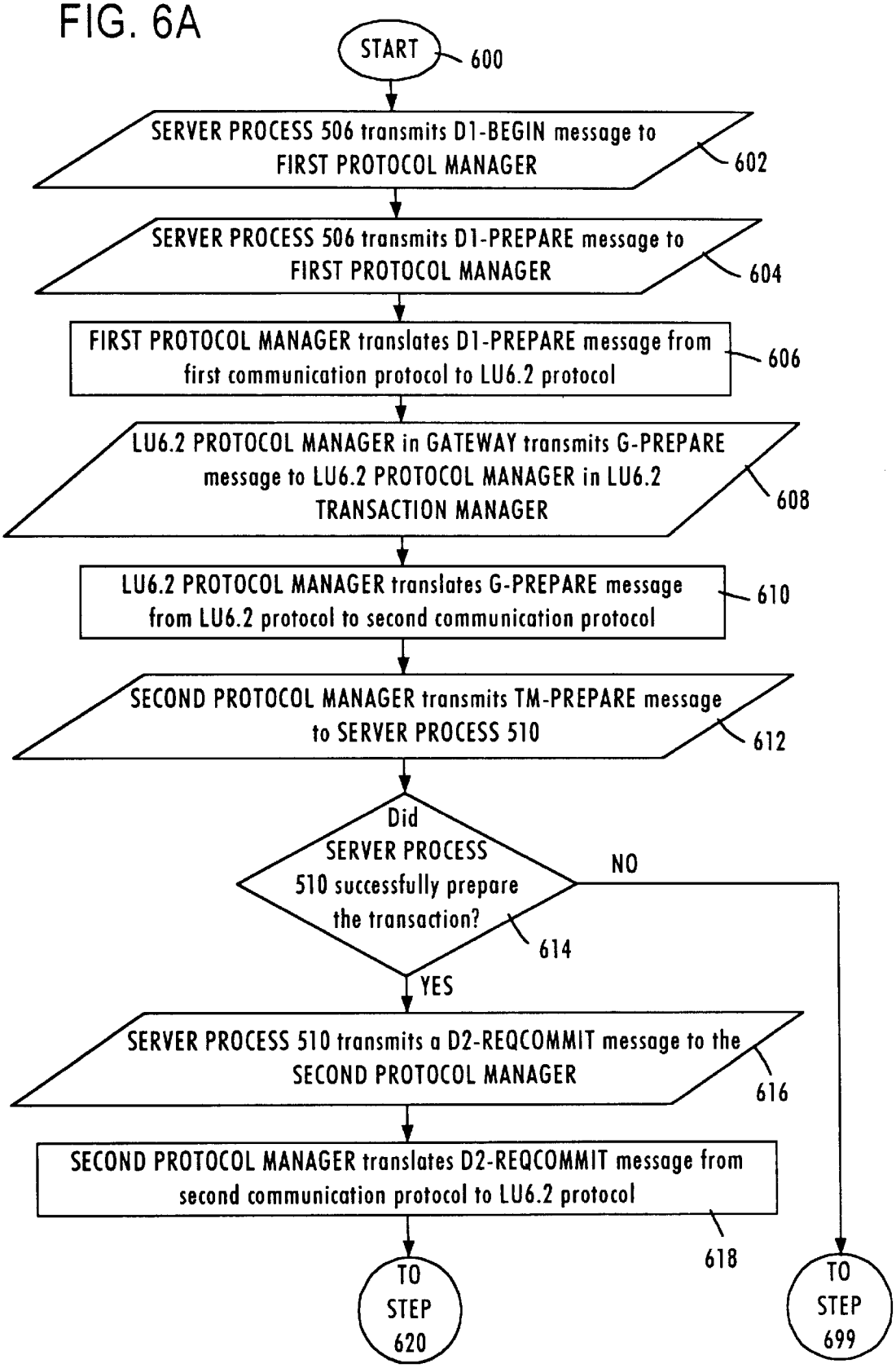
Figure 6C:
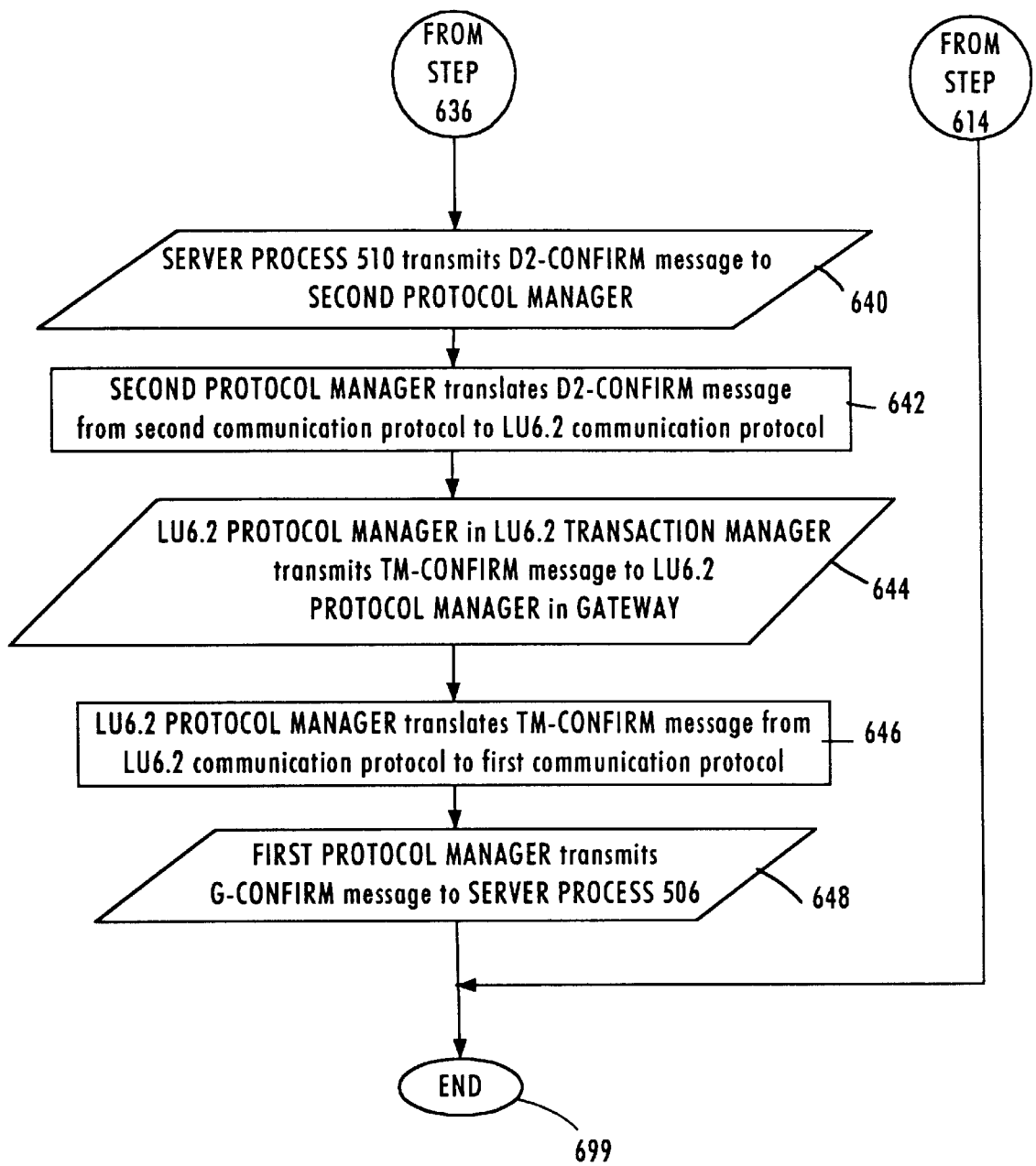

The processing of a distributed transaction involving database system 502 and database system 504 using two-phase commit where the server process 506 is coordinating the processing of the distributed transaction is now described with reference to both FIG. 5 and the flow chart comprised of FIGS. 6A, 6B and 6C. After starting in step 600, server process 506 begins processing the distributed transaction by transmitting a D1-BEGIN message to the first protocol manager 518 in step 602. The D1-BEGIN message includes a transaction identifier (GTXID) which uniquely identifies the distributed transaction to facilitate recovery after a failure.

In step 604, server process 506 transmits a D1-PREPARE message to first protocol manager 518 requesting that server process 510 prepare the transaction by making changes to database 512 as specified by the distributed transaction. In step 606, first protocol manager 518 translates the D1-PREPARE message from first communication protocol to a G-PREPARE message in LU6.2 communication protocol. In step 608, LU6.2 protocol manager 520 transmits the G-PREPARE message to LU6.2 protocol manager 522. In step 610, LU6.2 protocol manager 522 translates the G-PREPARE message from LU6.2 protocol to a TM-PREPARE message in the database system protocol. In step 612, second protocol manager 524 transmits the TM-PREPARE message to server process 510.

In step 614, server process 510 makes updates to database 512 as specified in the distributed transaction. If an error prevents server process 510 from making the specified updates to database 512, then server process 510 cannot prepare and the distributed transaction terminates in step 699.

If, on the other hand, in step 614, server process 510 successfully prepares the distributed transaction, then the processing of the distributed transaction may continue to the commit phase.

Having successfully prepared the distributed transaction, server process 510 makes a request to server process 506 to commit the distributed transaction by transmitting a D2-REQCOMMIT message to the second protocol manager 524 in step 616. In step 618, after receiving the D2-REQCOMMIT message, second protocol manager 524 translates the D2-REQCOMMIT message from the second communication protocol to LU6.2 protocol. In step 620, LU6.2 protocol manager 522 transmits the TM-REQCOMMIT message to LU6.2 protocol manager 520. In step 622, LU6.2 protocol manager 520 translates the TM-REQCOMMIT from LU6.2 protocol to a G-REQCOMMIT message conforming to first communication protocol. In step 624, gateway 516 transmits the G-REQCOMMIT message to server process 506, completing the prepare phase of the two-phase commit process. Upon receipt of the G-REQCOMMIT message in step 624, server process 506 knows that server process 510 has successfully prepared the distributed transaction and is ready to commit the distributed transaction.

Once server process 506 has applied the changes to database 508 as specified by the distributed transaction, then the distributed transaction can be committed. To commit the distributed transaction, server process 506 issues a D1-COMMIT message to first protocol manager 518 in step 626. In step 628, first protocol manager 518 translates the D1-COMMIT message from database system protocol to a G-COMMIT message conforming to LU6.2 protocol. Then, in step 630, LU6.2 protocol manager 520 transmits the G-COMMIT message to LU6.2 protocol manager 522. In step 630, LU6.2 protocol manager 522 translates the G-COMMIT message from LU6.2 communication protocol to a TM-COMMIT message conforming to second communication protocol. In step 634, second protocol manager 524 transmits the TM-COMMIT message to server process 510.

Upon receipt of the TM-COMMIT message from LU6.2 transaction manager 514, server process 510 commits the transaction by making the changes previously made to database 512 permanent. Then in step 640, server process 510 transmits a D2-CONFIRM message to second protocol manager 524. In step 642, second protocol manager 524 translates the D2-CONFIRM message from database system protocol to a TM-CONFIRM message conforming to LU6.2 protocol. Then, in step 644, LU6.2 protocol manager 522 transmits the TM-CONFIRM message to LU6.2 protocol manager 520 in gateway 516. In step 646, LU6.2 protocol manager 520 translates the TM-CONFIRM message from LU6.2 protocol to a G-CONFIRM message conforming to database system protocol. In step 648, first protocol manager 518 transmits the G-CONFIRM message to server process 506. Upon receipt of the G-CONFIRM message, server process 506 knows that server process 510 has committed the distributed transaction. Accordingly, once server process 506 has also committed the distributed transaction, that is, made the changes it previously made to database 508 permanent, then the distributed transaction is complete.

As just described, the present invention provides for the processing of a distributed transaction using two-phase commit where the transaction specified changes to be applied by two different processes 502, 504 which do not support a common communication protocol. Gateway 516 allows server process 506 to communicate with other processes involved in the distributed transaction as if those processes supported the communication protocol supported by server process 506. In the simple case involving server process 506 and one other process (server process 510) to process a distributed transaction, gateway 516 functions as a translator, while server process 506 is responsible for managing the processing of the distributed transaction. Server process 506 transmits prepare and commit messages to gateway 516 which are translated and re-transmitted to server process 510.

However, for distributed transactions involving server process 506 and two or more other processes, gateway 516 performs additional functions which would ordinarily be performed by server process 506. Specifically, once the prepare message (D1 -PREPARE) is received from server process 506, gateway 516 automatically handles preparing all processes involved in the distributed transaction. Gateway 516 maintains status information for each process participating in the processing of the distributed transaction and once all participating processes have successfully prepared, gateway 516 transmits the G-REQCOMMIT message to server process 506. Also, once the D1-COMMIT message is received from server process 506, gateway 516 automatically handles committing all of the participating processes. More importantly, in the event of an error during the prepare phase, indicating that one or more of the participating processes cannot prepare, gateway 516 automatically handles the rollback of all participating processes without any further input required from server process 506. Gateway 516 accomplishes this by commanding all participating processes specified by the distributed transaction to retract their respective changes and terminate processing. The propagation of prepare and commit messages and rollback after a failure is automatically managed by gateway 516 and is transparent to server process 506.

According to one embodiment of the present invention, gateway 516 maintains an internal table containing sufficient information about each of the participating processes in a distributed transaction so that gateway 516 may propagate prepare and commit messages to each of the participating processes and manage the rollback of the participating processes after an error. According to one embodiment of the present invention, the table contains information identifying all participating processes as well as a status for each participating process. The status indicates whether a participating process has prepared, committed and whether any errors have occurred.

Although this embodiment of the present invention has been described with respect to server process 506 coordinating the processing of a distributed transaction specifying changes to both databases 508, 512, the present invention is applicable to the processing of distributed transactions involving any number of databases located together or separately on one or more nodes, with or without a separate coordinating process. In addition, although LU6.2 transaction manager 514 has been described in the context of an LU6.2 transaction manager, the present invention is equally applicable to distributed computing environments in which a transaction manager supports other communication protocols besides LU6.2.

Also, the present invention is applicable to distributed computing environments where database system 502, database system 504, LU6.2 transaction manager 514 and gateway 516 are physically located together or apart on one or more nodes of a distributed computing network.

Although the present invention has been illustrated in the context of software running at different physical sites, the solution provided by the approach described herein is equally effective for different software tasks running at the same site.

In the foregoing specification, the invention has been described with reference to specific embodiments thereof. It will, however, be evident that various modifications and changes may be made thereto without departing from the broader spirit and scope of the invention. The specification and drawings are, accordingly, to be considered in an illustrative rather than a restrictive sense.

What is claimed is:

1. A method for processing a distributed transaction using two-phase commit where the distributed transaction specifies a first set of operations to be performed by a first process supporting a first communication protocol and a second set of operations to be performed by a second process supporting a second communication protocol and having a first transaction manager communicatively coupled thereto, the method comprising the steps of:

receiving a first prepare message conforming to the first communication protocol from the first process;

generating, in response to the first prepare message, a second prepare message conforming to a third communication protocol;

transmitting the second prepare message to the first transaction manager causing the second process to perform the second set of operations without making the results of performing the second set of operations permanent;

receiving a first confirm prepare message from the first transaction manager indicating that the second set of operations has been performed by the second process, the first confirm prepare message conforming to the third communication protocol;

generating, in response to the first confirm prepare message, a second confirm prepare message conforming to the first communication protocol;

transmitting the second confirm prepare message to the first process;

receiving a first commit message from the first process conforming to the first communication protocol;

generating, in response to the first commit message, a second commit message conforming to the third communication protocol; and transmitting the second commit message to the first transaction manager causing the second process to make the results of performing the second set of operations permanent.

2. The method of claim 1, wherein the distributed transaction specifies a third set of operations to be performed by a third process supporting the second communication protocol and having a second transaction manager communicatively coupled thereto, and wherein the method further comprises the steps of
a) transmitting the second prepare message to the second transaction manager causing the third process to perform the third set of operations without making the results of performing the third set of operations permanent, and b) receiving a third confirm prepare message from the second transaction manager indicating that the third set of operations has been performed by the third process, the third confirm prepare message conforming to the third communication protocol, wherein the step of transmitting a second confirm prepare message to the first process occurs only after both the first confirm prepare message is received from the first transaction manager and the third confirm prepare message is received from the second transaction manager.

3. The method of claim 2, further comprising the step of if one of the second process and the third process cannot perform its respective set of operations, then a) transmitting a first rollback message conforming to the third communication protocol to the first transaction manager causing the second process to undo the results of performing the second set of operations, and b) transmitting a second rollback message conforming to the third communication protocol to the second transaction manager causing the third process to undo the results of performing the third set of operations.

4. The method of claim 2, further comprising the steps of a) transmitting the second commit message to the second transaction manager causing the third process to make the results of performing the third set of operations permanent, b) receiving a first confirm commit message conforming to the third communication protocol from the first transaction manager indicating that the results of performing the second set of operations have been made permanent, c) receiving a second confirm commit message conforming to the third communication protocol from the second transaction manager indicating that the results of performing the third set of operations have been made permanent, and d) if both the first and second confirm commit messages have been received from the first and second transaction managers, respectively, then transmitting a third confirm commit message conforming to the first communication protocol to the first process indicating that the results of performing the second and third sets of operations have been made permanent.

5. The method as recited in claim 1, wherein the second communication protocol is the same as the third communication protocol.

6. The method as recited in claim 1, wherein:

the second communication protocol is different than the third communication protocol, and the method further comprises the steps of:

the first transaction manager generating, in response to the second prepare message, a third prepare message conforming to the second communication protocol, the first transaction manager transmitting the third prepare message to the second process, the first transaction manager receiving a preliminary confirm prepare message from the second process, the preliminary confirm prepare message conforming to the second communication protocol, and the first transaction manager generating, in response to the preliminary confirm prepare message, the first confirm prepare message.

7. A method for facilitating the processing of a distributed transaction using two-phase commit where the distributed transaction specifies a first set of operations to be performed by a first database system supporting a first communication protocol and a second set of operations to be performed by a second database system supporting a second communication protocol and having an LU6.2 transaction manager communicatively coupled thereto, the method comprising the steps of:

a) in response to receiving prepare and commit messages from the first database system conforming to the first communication protocol, i) generating LU6.2 prepare and commit messages conforming to LU6.2 communication protocol, and ii) transmitting the LU6.2 prepare and commit messages to the LU6.2 transaction manager communicatively coupled to the second database system, the LU6.2 prepare messages causing the second database system to perform the second set of operations without making the results permanent, the LU6.2 commit messages causing the second database system to make the results of performing the second set of operations permanent; and b) in response to receiving first LU6.2 confirm prepare and confirm commit messages conforming to LU6.2 communication protocol from the LU6.2 transaction manager communicatively coupled to the second database system, the first LU6.2 confirm prepare messages confirming that the second set of operations have been performed by the second database system without the results being made permanent, the first LU6.2 confirm commit messages confirming that the results of the second set of operations have been made permanent, i) translating the first LU6.2 confirm prepare and confirm commit messages into translated confirm prepare and confirm commit messages conforming to the first communication protocol, and ii) transmitting the translated confirm prepare and confirm commit messages to the first database system.

8. The method of claim 7, wherein a) the distributed transaction specifies a third set of operations to be performed by a third database system supporting the second communication protocol and having an LU6.2 transaction manager communicatively coupled thereto, b) the method further comprises the step of transmitting the LU6.2 prepare and commit messages to the LU6.2 transaction manager communicatively coupled to the third database system, c) the step of transmitting the translated confirm prepare message to the first database system further comprises the step of when both the first LU6.2 confirm prepare message has been received from the LU6.2 transaction manager communicatively coupled to the second database system and a second LU6.2 confirm prepare message has been received from the LU6.2 transaction manager communicatively coupled to the third database system, then transmitting the translated confirm prepare message to the first database system.

9. The method of claim 8, further comprising the step of if one of the second database system and the third database system cannot perform its respective set of operations, then a) transmitting a first LU6.2 rollback message conforming to the third communication protocol to the LU6.2 transaction manager communicatively coupled to the second database system causing the second database system to undo the results of performing the second set of operations, and b) transmitting a second LU6.2 rollback message conforming to the third communication protocol to the LU6.2 transaction manager communicatively coupled to the third database system causing the third database system to undo the results of performing the third set of operations.

10. The method of claim 7, wherein the step of transmitting the translated confirm commit messages to the first database system only occurs if both the first LU6.2 confirm commit message is received from the LU6.2 transaction manager communicatively coupled to the second database system and a second LU6.2 confirm commit message is received from the LU6.2 transaction manager communicatively coupled to the third database system.

11. A computer-readable medium having stored thereon a plurality of sequences of instructions, the plurality of sequences of instructions including sequences of instructions which, when executed by one or more processors, cause the one or more processors to process a distributed transaction using two-phase commit where the distributed transaction specifies a first set of operations to be performed by a first process supporting a first communication protocol and a second set of operations to be performed by a second process supporting a second communication protocol and having a first transaction manager communicatively coupled thereto, the instructions further causing the process or to perform the steps of:

receiving a first prepare message conforming to the first communication protocol from the first process;

generating, in response to the first prepare message, a second prepare message conforming to a third communication protocol;

transmitting the second prepare message to the first transaction manager causing the second process to perform the second set of operations without making the results of performing the second set of operations permanent;

receiving a first confirm prepare message from the first transaction manager indicating that the second set of operations has been performed by the second process, the first confirm prepare message conforming to the third communication protocol;

generating, in response to the first confirm prepare message, a second confirm prepare message conforming to the first communication protocol;

transmitting the second confirm prepare message to the first process;

receiving a first commit message from the first process conforming to the first communication protocol;

generating, in response to the first commit message, a second commit message conforming to the third communication protocol; and transmitting the second commit message to the first transaction manager causing the second process to make the results of performing the second set of operations permanent.

12. The computer-readable medium of claim 11, wherein the distributed transaction specifies a third set of operations to be performed by a third process supporting the second communication protocol and having a second transaction manager communicatively coupled thereto, and wherein the computer-readable medium further includes instructions for a) transmitting the second prepare message to the second transaction manager causing the third process to perform the third set of operations without making the results of performing the third set of operations permanent, and b) receiving a third confirm prepare message from the second transaction manager indicating that the third set of operations has been performed by the third process, the third confirm prepare message conforming to the third communication protocol, wherein the step of transmitting a second confirm prepare message to the first process occurs only after both the first confirm prepare message is received from the first transaction manager and the third confirm prepare message is received from the second transaction manager.

13. The computer-readable medium of claim 12, wherein the computer-readable medium further includes instructions for a) transmitting the second commit message to the second transaction manager causing the third process to make the results of performing the third set of operations permanent, b) receiving a first confirm commit message conforming to the third communication protocol from the first transaction manager indicating that the results of performing the second set of operations have been made permanent, c) receiving a second confirm commit message conforming to the second communication protocol from the second transaction manager indicating that the results of performing the third set of operations have been made permanent, and d) if both the first and second confirm commit messages have been received from the first and second transaction managers, respectively, then transmitting a third confirm commit message conforming to the first communication protocol to the first process indicating that the results of performing the second and third sets of operations have been made permanent.

14. The method of claim 11, wherein the computer-readable medium further includes instructions for if one of the second process and the third process cannot perform its respective set of operations, then a) transmitting a first rollback message conforming to the third communication protocol to the first transaction manager causing the second process to undo the results of performing the second set of operations, and b) transmitting a second rollback message conforming to the third communication protocol to the second transaction manager causing the third process to undo the results of performing the third set of operations.

15. A system for processing a distributed transaction using two-phase commit where the distributed transaction specifies a set of first operations to be performed by a first process supporting a first communication protocol and a set of second operations to be performed by two or more second processes, wherein each of the second processes supports a second communication protocol and has an LU6.2 transaction manager communicatively coupled thereto, the system comprising:

a) one or more nodes; and b) a gateway executing on the one or more nodes, the gateway being configured to
  receive prepare and commit messages conforming to the first communication protocol from the first process,
  generate, based upon the received prepare and commit messages, translated prepare and commit messages confirming to LU6.2 communication protocol,
  transmit the translated prepare and commit messages to each of the LU6.2 transaction managers,
  receive LU6.2 confirm prepare and confirm commit messages conforming to LU6.2 communication protocol from each of the LU6.2 transaction managers,
  if an LU6.2 confirm prepare message has been received from each of the LU6.2 transaction managers, generate and transmit a confirm prepare message conforming to the first communication protocol to the first process,
  if any of the second processes cannot perform its respective second operations specified by the distributed transaction, generate and transmit an LU6.2 rollback message conforming to the LU6.2 communication protocol to each of the LU6.2 transaction managers causing each of the second processes to undo its respective second operations specified by the distributed transaction, and
  if an LU6.2 confirm commit message has been received from each of the LU6.2 transaction managers, transmit a confirm commit message conforming to the first communication protocol to the first process.

16. A gateway configured to provide for the processing of a distributed transaction using two-phase commit where the distributed transaction specifies a set of first operations to be performed by a first process and a set of second operations to be performed by one or more second processes, the first process supporting a first communication protocol, each of the second processes supporting a second communication protocol and having an LU6.2 transaction manager communicatively coupled thereto, the gateway comprising:
 a) a first protocol manager configured to
  i) receive prepare and commit messages conforming to the first communication protocol from the first process,
  ii) generate, based upon the prepare and commit messages, LU6.2 prepare and commit messages conforming to LU6.2 communication protocol, and
  iii) transmit the LU6.2 prepare and commit messages to each of the LU6.2 transaction managers; and
 b) an LU6.2 protocol manager configured to
  i) receive LU6.2 confirm prepare and confirm commit messages conforming to LU6.2 communication protocol from each of the LU6.2 transaction managers;
  ii) if a confirm prepare message has been received from each of the LU6.2 transaction managers, generate and transmit a confirm prepare message conforming to the first communication protocol to the first process,
  iii) if any of the second processes cannot perform its respective second operations specified by the distributed transaction, generate and transmit an LU6.2 rollback message conforming to the LU6.2 communication protocol to each of the LU6.2 transaction managers causing each of the second processes to undo its respective second operations specified by the distributed transaction,
  iv) if an LU6.2 confirm commit message has been received from each of the LU6.2 transaction managers, generate and transmit a confirm commit message conforming to the first communication protocol to the first process.

17. A method for processing a distributed transaction using two-phase commit where the distributed transaction specifies a first set of operations to be performed by a first process supporting a first communication protocol and a second set of operations to be performed by a second process supporting a second communication protocol and having a first communication interface communicatively coupled thereto, the method comprising the steps of:
 receiving a first prepare message conforming to the first communication protocol from the first process;
 generating, in response to the first prepare message, a second prepare message conforming to a third communication protocol;
 transmitting the second prepare message to the first communication interface causing the second process to perform the second set of operations without making the results of performing the second set of operations permanent;
 receiving a first confirm prepare message from the first communication interface indicating that the second set of operations has been performed by the second process, the first confirm prepare message conforming to the third communication protocol;
 generating, in response to the first confirm prepare message, a second confirm prepare message conforming to the first communication protocol;
 transmitting the second confirm prepare message to the first process;
 receiving a first commit message from the first process conforming to the first communication protocol;
 generating, in response to the first commit message, a second commit message conforming to the third communication protocol; and
 transmitting the second commit message to the first communication interface causing the second process to make the results of performing the second set of operations permanent.

* * * * *